Jan. 2, 1923.

E. REVEGA.
RAILROAD SPEED INDICATING DEVICE.
FILED MAR. 23, 1920.

INVENTOR.
Efrem Revega
BY
ATTORNEY.

Jan. 2, 1923.
E. REVEGA.
RAILROAD SPEED INDICATING DEVICE.
FILED MAR. 23, 1920.
1,440,798
2 SHEETS-SHEET 2
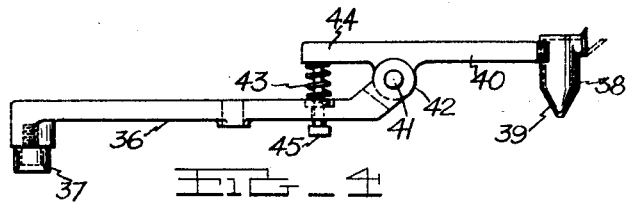
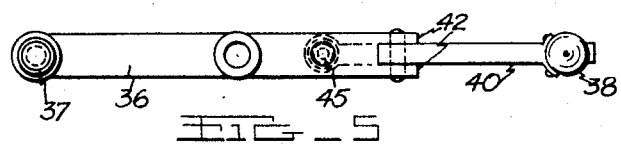
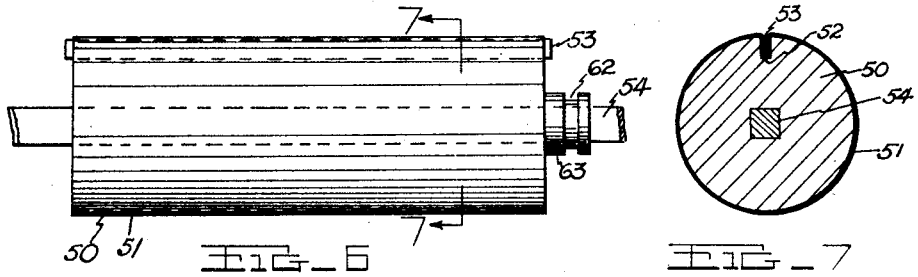
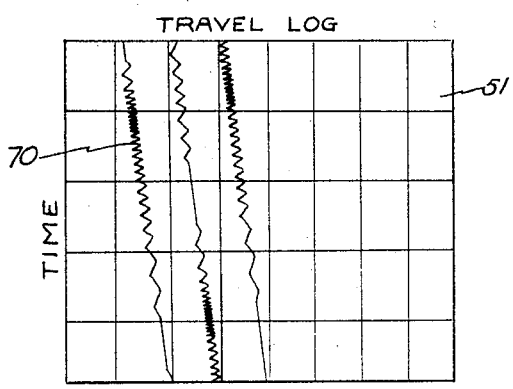
INVENTOR.
Efrem Revega
BY
ATTORNEY.

Patented Jan. 2, 1923.

1,440,798

UNITED STATES PATENT OFFICE.

EFREM REVEGA, OF DETROIT, MICHIGAN.

RAILROAD SPEED-INDICATING DEVICE.

Application filed March 23, 1920. Serial No. 368,095.

*To all whom it may concern:*

Be it known that I, EFREM REVEGA, a citizen of Russia, residing at Detroit, county of Wayne, and State of Michigan, have invented certain new and useful Improvements in Railroad Speed-Indicating Devices, of which the following is a specification.

This invention relates to a speed indicator for trains and it has for an object to provide a novel and simple form of device whereby a graphical record of the speed of the locomotive during an entire trip or run may be made.

A further object is to provide a novel form of shifting means for the record sheet.

For further comprehension of the invention, and of the objects and advantages thereof, reference will be had to the following description and accompanying drawings, and to the appended claims in which the various novel features of the invention are more particularly set forth.

Figure 1 of the drawings is a side view of my improved speed indicator, showing it in position on a locomotive.

Figure 4 is a detail side view of the pin operating arm.

Figure 5 is an inside face view thereof.

Figure 6 is a detail side view of the record sheet roller.

Figure 7 is a transverse section on the line 7—7 of Figure 6.

Figure 8 is a detail face view of a record sheet.

Figure 1:
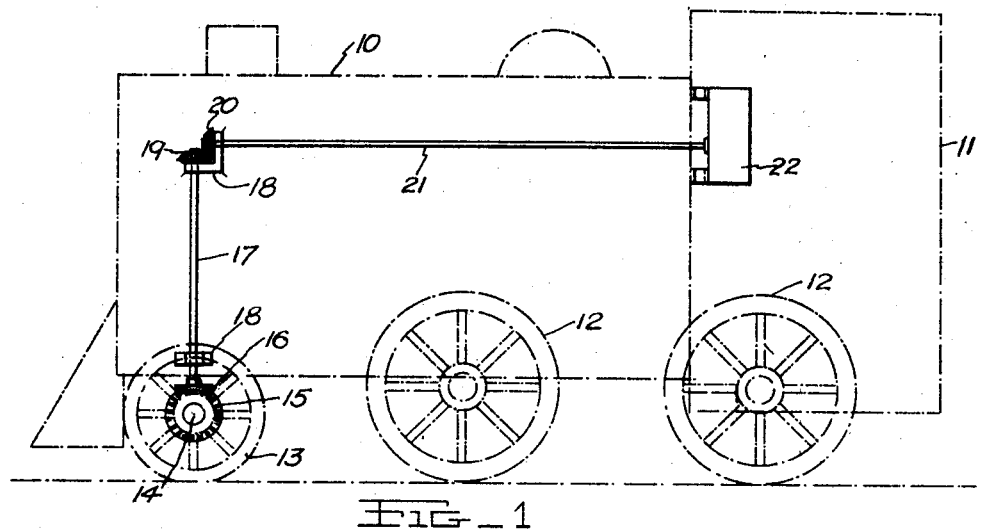
Figures 2, 3:
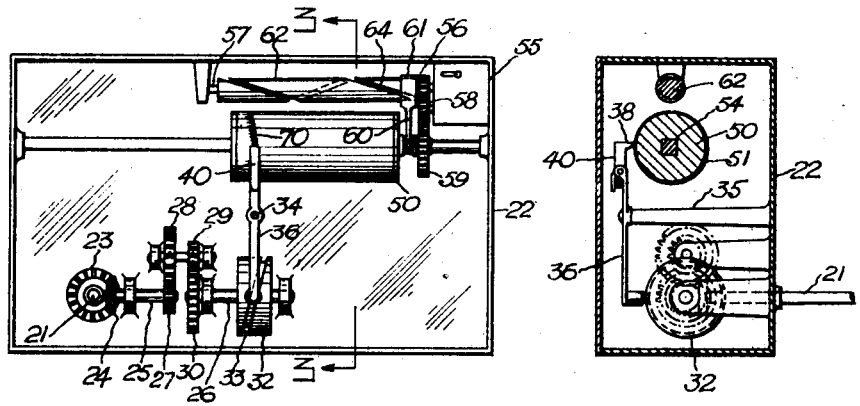
Figure 2 is a front view of the recording device with the cover of the enclosing casing removed.
Figure 3 is a transverse section on the line 3—3 of Figure 2.

In the drawings the boiler of a locomotive is indicated at 10, the cab at 11, the driving wheels at 12, and the truck wheels at 13, my improved speed indicator being preferably operated from the truck wheels.

As here shown the axle 14 of the truck wheels has fixed thereto a bevel gear 15 which meshes with a second bevel gear 16 on the lower end of a vertical shaft 17 extending upwardly beside the boiler and journaled in suitable bearings 18. Upon the upper end of this shaft is fixed a bevel gear 19 meshing with another bevel gear 20 on the forward end of a shaft 21 which extends horizontally rearwardly to the indicating device proper, which is preferably enclosed in a box or casing 22 secured to the side of the cab 11. The shaft passes through the front wall of this casing and has another bevel gear 23 fixed on the end projecting into the casing, this gear meshing with a similar gear 24 on a stub shaft 25. This stub shaft 25 drives an alined stub shaft 26 through the reducing gears 27, 28, 29 and 30. Upon the shaft 26 is fixed a cam disk 32 having a diagonally disposed annular cam groove 33 in its periphery. Pivoted between its ends as at 34 to a post 35 projecting from the wall of the casing 22 is an arm 36 having upon one end an offset stud 37 projecting into the cam groove 33, the arm 36 being adapted to be oscillated in opposite directions from a vertical position by engagement of the pin with the cam groove. The upper end of this arm carries a marking or tracing pen which may be of well known construction consisting of a reservoir 38 for ink having a pointed perforated end 39 adapted to engage the record sheet. In order to cause the end 39 of the pen to bear at all times on the sheet it is preferably fixed on a short arm 40 pivoted as at 41 between a pair of ears 42 on the upper end of the arm 36 to swing at right angles to the latter, an expansion spring 43 bearing between the arm 36 and a tail piece 44 on the arm 40, to cause the pen to be yieldingly pressed against the record sheet. This spring is coiled around a headed pin 45 which passes through a suitable hole in the arm and is secured to the tail-piece 44, thus limiting the movement of the arm 40.

The record sheet is adapted to be fixed on a suitable rotatable roller, the roller being shown at 50 and the record sheet at 51. As shown in Figures 6 and 7 the record sheet may be secured in place by turning the ends thereof into a longitudinal slot 52 in the roller and wedging a bar 53 into said slot between said inturned ends.

The roller is adapted to have axial as well as rotary movement and to this end it is slidably mounted on a square shaft 54 suitably journaled at its ends in opposite walls of the casing 22. This shaft 54 is rotated by a clock mechanism, within a box 55 fixed in one corner of the casing, which drives a gear 56 on a shaft 57 extending above the roller 50. The gear 56 meshes with an idler 58 which meshes in turn with a gear 59 fixed on the shaft 54. The roller 50 is moved axially by means of an arm 60 projecting rigidly from a nut-sleeve 61 slidable on a cylinder 62 fixed on the shaft 57, the arm engaging in an annular groove 62 in a hub 63 on the roller 50. A spiral groove 64 extends from end to end of this cylinder 62, and a suitable stud projects inwardly from the sleeve into said groove. It will be apparent that the rotation of shaft 57 and cylinder 62 by the clock mechanism will cause the sleeve 61 to move longitudinally of the cylinder and thus move the roller 50 along the shaft 54.

It is believed that the manner of operation of my improved speed indicator will be apparent from the above description. When the locomotive is moving the cam will be caused to rotate and the arm to oscillate the pen on the upper end, oscillating longitudinally of the cylinder, the frequency of the oscillations varying according to the speed of the locomotive. As the roller is rotating at the same time the pen is caused to travel the zig-zag path over the roller indicated at 70, and since the rate of rotation of the roller remains constant the line traced by the marker will vary as the speed of the locomotive varies from a very dense or close formation when the locomotive is running at high speed to the very open formation when running at slow speed, the zig-zag formation being entirely absent when the locomotive is at rest. As the roller is gradually moved axially the marker moves in generally spiral direction thereover so that the completed record sheet will show the rows of speed lines as shown in Figure 8.

Having thus described my invention what I claim as new and desire to secure by Letters Patent of the United States is—

In a speed indicator for locomotives, a casing, a post projecting from the inner wall of said casing, an arm pivoted between its ends on said post, an offset stud on one end of said arm, means for oscillating said arm by means of said stud, a tracing fountain pen at the opposite end of said arm adapted to engage with its pointed and perforated end a record sheet, a pair of ears on said arm, a short arm pivoted between said ears, an expansion spring for pressing said pen against the record sheet, means for limiting the movements of said short arm, means for carrying the record sheet, means for rotating the same and said first named means providing a means for varying the frequency of the oscillations of said arm with the variation in speed of a locomotive.

In testimony whereof I have affixed my signature.

EFREM REVEGA.